US010183588B2

(12) United States Patent
Jin et al.

(10) Patent No.: US 10,183,588 B2
(45) Date of Patent: Jan. 22, 2019

(54) BATTERY MODULE LITHIUM PLATING REDUCTION

(71) Applicant: Johnson Controls Technology Company, Holland, MI (US)

(72) Inventors: Zhihong Jin, Pewaukee, WI (US); Zhenli Zhang, Glendale, WI (US); Timur L. Aliyev, Chicago, IL (US); Brian C. Sisk, Mequon, WI (US); Miaomiao Ma, Boyds, MD (US)

(73) Assignee: Johnson Controls Technology Company, Auburn Hills, MI (US)

( * ) Notice: Subject to any disclaimer, the term of this patent is extended or adjusted under 35 U.S.C. 154(b) by 332 days.

(21) Appl. No.: 14/989,578

(22) Filed: Jan. 6, 2016

(65) Prior Publication Data
US 2017/0190262 A1 Jul. 6, 2017

(51) Int. Cl.
*H01M 6/00* (2006.01)
*B60L 11/18* (2006.01)
(Continued)

(52) U.S. Cl.
CPC ..... *B60L 11/1861* (2013.01); *H01M 10/0525* (2013.01); *H01M 10/425* (2013.01);
(Continued)

(58) Field of Classification Search
CPC ........... H01M 10/0525; H01M 10/425; H01M 10/44; H01M 10/46; H01M 2010/4271;
(Continued)

(56) References Cited

U.S. PATENT DOCUMENTS 5,948,569 A 9/1999 Moses et al.
8,093,903 B2 1/2012 Nishi et al.
(Continued)

FOREIGN PATENT DOCUMENTS

DE 102013204527 9/2014
JP 2010140762 A 6/2010
JP 2014207174 A 10/2014

OTHER PUBLICATIONS

Karen E. Thomas, John Newman; "Thermal Modeling of Porous Insertion Electrodes"; Journal of The Electrochemical Society; 150(2); pp. A176-A192; 2003.
(Continued)

*Primary Examiner* — Raymond Alejandro
(74) *Attorney, Agent, or Firm* — Fletcher Yoder, P.C.

(57) ABSTRACT

A battery system includes a lithium ion battery that couples to an electrical system. The battery system also includes a battery management system that electrically couples to the lithium ion battery and controls one or more recharge parameters of the lithium ion battery. Additionally, the battery management system monitors one or more parameters of the lithium ion battery. Further, the battery management system controls the recharge parameters of the lithium ion battery based on at least one lithium plating model and the monitored parameters. Furthermore, the at least one lithium plating model indicates a relationship between the one or more parameters of the lithium ion battery and a likelihood of lithium plating occurring in the lithium ion battery.

18 Claims, 5 Drawing Sheets

(51) Int. Cl.
*H01M 10/0525* (2010.01)
*H01M 10/42* (2006.01)
*H01M 10/44* (2006.01)
*H01M 10/46* (2006.01)
*H02J 7/00* (2006.01)
*H01M 10/48* (2006.01)
*H01M 10/0587* (2010.01)

(52) U.S. Cl.
CPC ........... *H01M 10/44* (2013.01); *H01M 10/46* (2013.01); *H01M 10/48* (2013.01); *H01M 10/482* (2013.01); *H01M 10/486* (2013.01); *H02J 7/007* (2013.01); *H01M 10/0587* (2013.01); *H01M 2010/4271* (2013.01); *H01M 2220/20* (2013.01); *Y02E 60/122* (2013.01)

(58) Field of Classification Search
CPC .. H01M 2220/20; B60L 11/1861; H02J 7/007
See application file for complete search history.

(56) References Cited

U.S. PATENT DOCUMENTS

| | | | |
|---|---|---|---|
| 8,541,122 B2 | 9/2013 | Fulop et al. | |
| 8,624,560 B2 | 1/2014 | Ungar et al. | |
| 8,704,489 B2 | 4/2014 | Hamaguchi et al. | |
| 8,754,614 B2 | 6/2014 | Paryani et al. | |
| 8,836,284 B2 | 9/2014 | Takahashi et al. | |
| 8,907,674 B2 | 12/2014 | Takahashi et al. | |
| 2008/0238357 A1 | 10/2008 | Bourilkov et al. | |
| 2009/0276172 A1 | 11/2009 | Nishi | |
| 2011/0012562 A1 | 1/2011 | Paryani | |
| 2013/0119921 A1 | 5/2013 | Choe et al. | |
| 2013/0317771 A1 | 11/2013 | Laskowsky et al. | |
| 2014/0062415 A1 | 3/2014 | Barsukov et al. | |
| 2014/0084867 A1 | 3/2014 | Hamaoka et al. | |
| 2015/0224845 A1* | 8/2015 | Anderson | B60G 17/019 701/37 |

OTHER PUBLICATIONS

Long Cai, Ralph E. White; "Reduction of Model Order Based on Proper Orthogonal Decomposition for Lithium-Ion Battery Simulations"; Journal of The Electrochemical Society; 156(3) pp. A154-A161; 2009.

Xiaosong Hu; Shengbo Li; Huei Peng; "A comparative study of equivalent circuit models for Li-ion batteries"; Journal of Power Sources; 198 pp. 359-367; 2012.

Roger D. Perkins, Alfred V. Randall. Xiangchun Zhang, Gregory L. Plett; "Controls oriented reduced order modeling of lithium deposition on overcharge"; Journal of Power Sources; 209 pp. 318-325; 2012.

PCT/US2016/045026 International Search Report and Written Opinion dated Oct. 31, 2016.

* cited by examiner

BATTERY MODULE LITHIUM PLATING REDUCTION

BACKGROUND

The present disclosure generally relates to the field of batteries and battery modules. More specifically, the present disclosure relates to controlling charging operations of lithium ion batteries to reduce a likelihood of lithium plating on anodes of the lithium ion batteries.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, the electric power used by the xEVs may be stored in lithium ion batteries. In some cases, active lithium ions within the lithium ion batteries of xEVs may deposit on an anode of the lithium ion batteries under certain conditions driving a charging operation of the lithium ion batteries. This effect is widely known as lithium plating, and the lithium plating may result in degradation of the lithium ion battery. The present disclosure is generally related to establishing dynamic parameters for charging operations to limit lithium plating on the anode of the lithium ion battery.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery system. The battery system includes a lithium ion battery that couples to an electrical system. The battery system also includes a battery management system that electrically couples to the lithium ion battery and controls one or more recharge parameters of the lithium ion battery. Additionally, the battery management system monitors one or more parameters of the lithium ion battery. Further, the battery management system controls the recharge parameters of the lithium ion battery based on at least one lithium plating model and the monitored parameters. Furthermore, the at least one lithium plating model indicates a relationship between the one or more parameters of the lithium ion battery and a likelihood of lithium plating occurring in the lithium ion battery.

The present disclosure also relates to a method to control a charging operation of a lithium ion battery. The method includes measuring one or more parameters of the lithium ion battery during the charging operation. Additionally, the method includes determining a likelihood of lithium plating at an anode based on at least one model relating to the likelihood of lithium plating at the anode of the lithium ion battery. Further, the at least one model indicates a relationship between the one or more parameters of the lithium ion battery and the likelihood of lithium plating. Furthermore, the method includes controlling the charging operation of the lithium ion battery based on the likelihood of lithium plating at the anode.

The present disclosure also relates to a battery module for use in a vehicle. The battery module includes a housing, a first terminal, and a second terminal. The battery module also includes a first battery disposed in the housing and coupled to the first terminal and the second terminal. Further, the battery module includes a second battery disposed in the housing, electrically coupled in parallel with the first battery, and electrically coupled to the first terminal and the second terminal. Furthermore, the battery module includes a battery management system that monitors one or more parameters of a charging operation of the battery module, and the battery management system controls the charging operation of the second battery based on an indication of a likelihood of lithium plating generated by at least one lithium plating model of the second battery.

DRAWINGS

Various aspects of this disclosure may be better understood upon reading the following detailed description and upon reference to the drawings in which.

Figure 5:
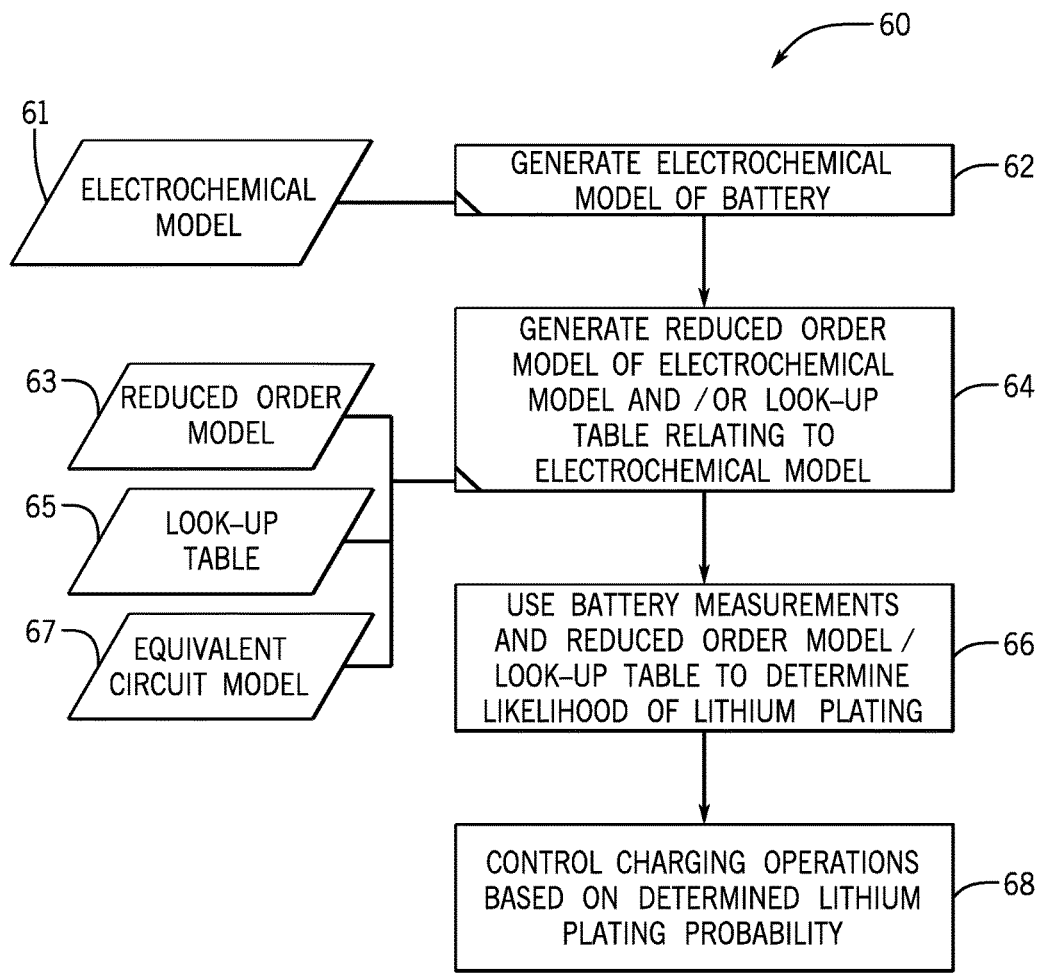
Figure 6:
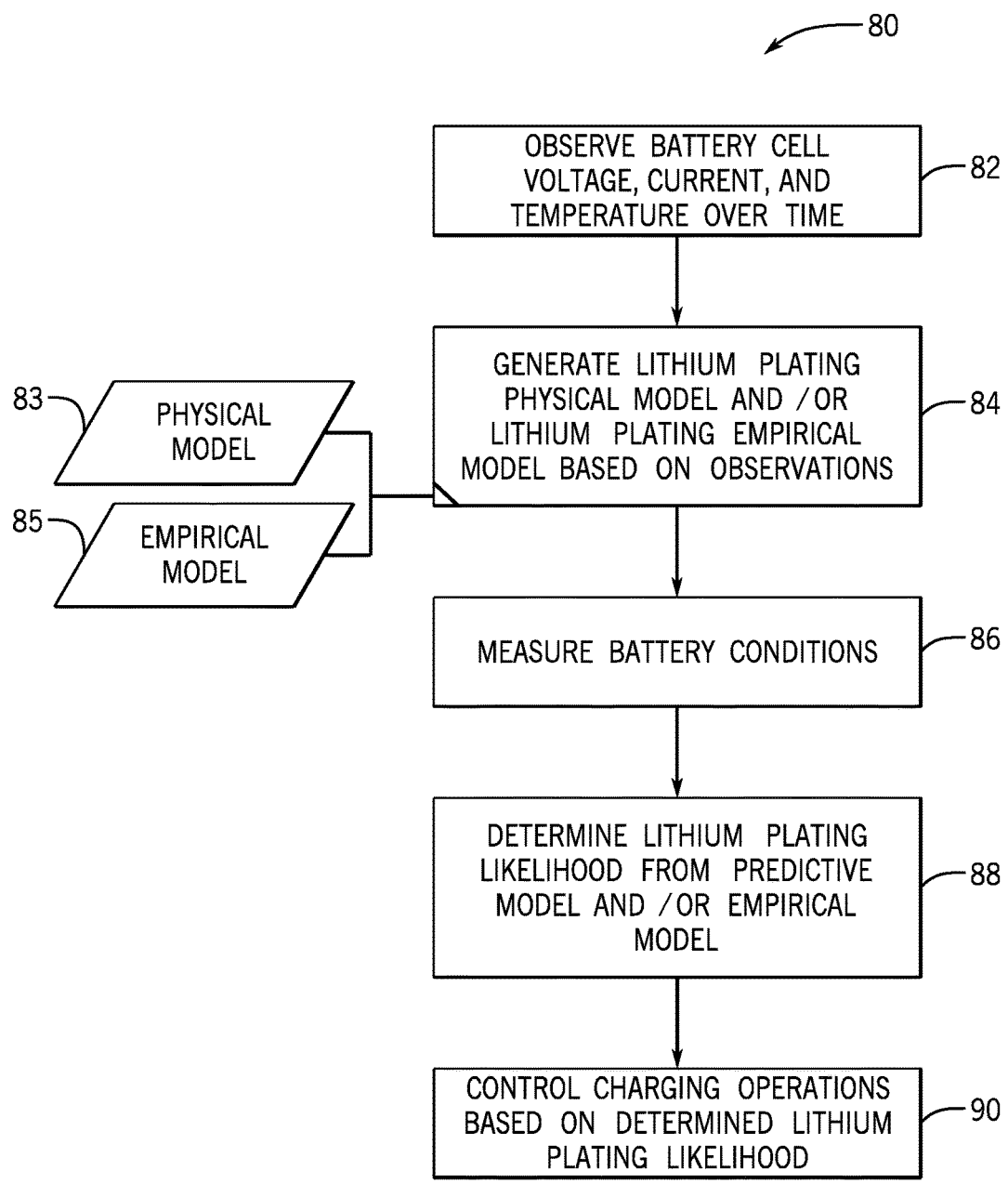

FIG. 5 is a process flow diagram describing a method for reducing the likelihood of lithium plating on an anode of a battery based on an electrochemical model of the battery, in accordance with an embodiment of the present approach; and FIG. 6 is a process flow diagram describing a method for controlling charging operations of a battery to reduce lithium plating on an anode of the battery based on a predictive model and/or an empirical model of lithium plating on the anode of the batter, in accordance with an embodiment of the present approach.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufactures, which generally produce traditional gas-powered vehicles, may desire to utilize improved vehicle technologies (e.g., regenerative braking technology) within their vehicle lines. Often, these manufacturers may utilize one of their traditional vehicle platforms as a starting point. Accordingly, since traditional gas-powered vehicles are designed to utilize 12 volt battery systems, a 12 volt lithium ion battery may be used to supplement a 12 volt lead-acid battery. More specifically, the 12 volt lithium ion battery may be used to more efficiently capture electrical energy generated during regenerative braking and subsequently supply electrical energy to power the vehicle's electrical system.

As advancements occur with vehicle technologies, high voltage electrical devices may also be included in the vehicle's electrical system. For example, the lithium ion battery may supply electrical energy to an electric motor in a mild-hybrid vehicle. Often, these high voltage electrical devices utilize voltage greater than 12 volts, for example, up to 48 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

Thus, the design choice regarding whether to utilize a 12 volt lithium ion battery or a 48 volt lithium ion battery may depend directly on the electrical devices included in a particular vehicle. Nevertheless, although the voltage characteristics may differ, the operational principles of a 12 volt lithium ion battery and a 48 volt lithium ion battery are generally similar. More specifically, as described above, both may be used to capture electrical energy during regenerative braking and subsequently supply electrical energy to power electrical devices in the vehicle.

Accordingly, to simplify the following discussion, the present techniques will be described in relation to a battery system with a 12 volt lithium ion battery and a 12 volt lead-acid battery. However, one of ordinary skill in art is able to adapt the present techniques to other battery systems, such as a battery system with a 48 volt lithium ion battery and a 12 volt lead-acid battery.

The present disclosure relates to batteries and battery modules. More specifically, the present disclosure relates to charging control of lithium ion batteries. Particular embodiments are directed to lithium ion battery cells that may be used in vehicular contexts (e.g., hybrid electric vehicles) as well as other energy storage/expending applications (e.g., energy storage for an electrical grid).

More specifically, the present disclosure relates to limiting lithium plating at anodes of the lithium ion batteries. When a lithium ion battery charges, it may be advantageous to limit certain charge parameters to lessen the likelihood of lithium plating at the anodes of the lithium ion batteries. To reduce the likelihood of lithium plating while still maintaining an efficient charge rate, limits to various charge parameters may be dynamically altered to correspond to measured parameters (e.g., charge current, temperature, or state of charge of the lithium ion battery) presently experienced by the lithium ion battery, which may affect the lithium ion battery's propensity toward experiencing lithium plating.

With the preceding in mind, the present disclosure describes techniques for controlling charging operations of a battery system to prevent the lithium ion batteries from experiencing lithium plating on anodes of the lithium ion batteries. Traditionally, to combat lithium plating, lithium ion battery manufacturers have provided a current limit for charging operations of lithium ion batteries. However, these current limits are often overly conservative for the specific circumstances surrounding a lithium ion battery, which may result in inefficient charging operations by unnecessarily limiting charge current levels. In contrast, a battery management system described in the present disclosure may measure operating parameters of the lithium ion batteries and control the charging operations to avoid operating parameter values of the lithium ion batteries that may result in an increased likelihood of lithium plating on the anodes. More specifically, when a charge current of the lithium ion battery, a temperature of the lithium ion battery, or a state of charge of the lithium ion battery reaches a certain performance level that may increase the likelihood of lithium plating, the controller may control the charging operation to avoid the certain performance levels to reduce the likelihood of the lithium plating. Thus, the techniques described herein enable a lithium ion battery to experience increased reliability and performance.

Figure 1:
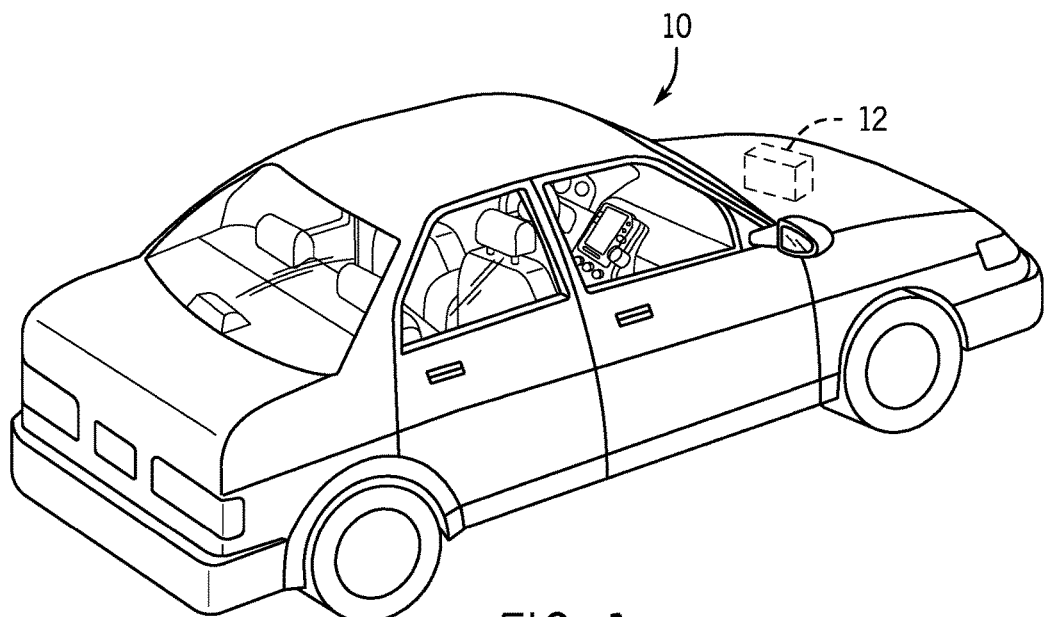
FIG. 1 is perspective view of a vehicle (an xEV) having a battery system contributing all or a portion of the power for the vehicle, in accordance with an embodiment of the present approach.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
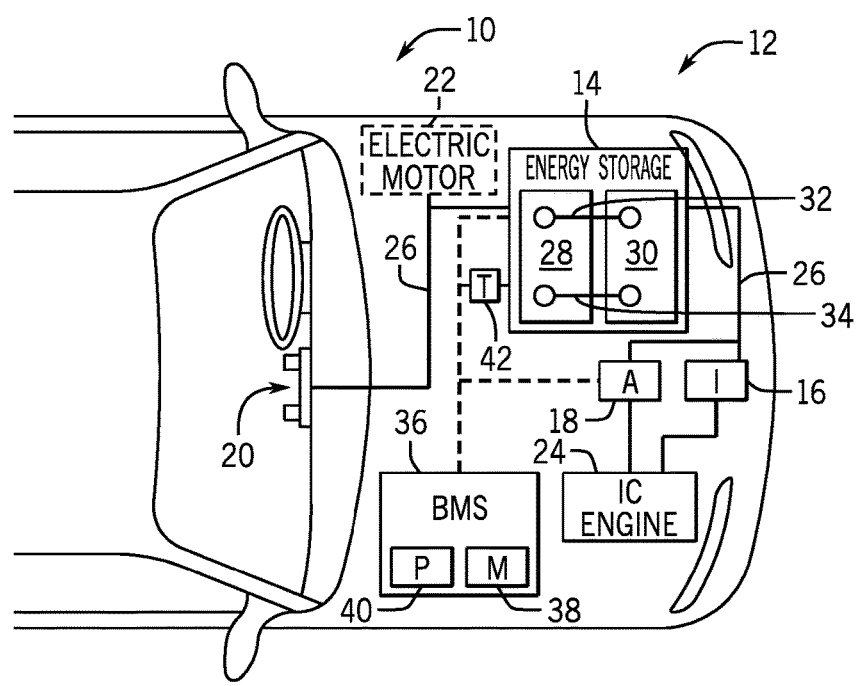
FIG. 2 is a cutaway schematic view of the xEV of FIG. 1 in the form of a hybrid electric vehicle (HEV), in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) an internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lead acid (e.g., a first) battery module 28 in accordance with present embodiments, and a lithium ion (e.g., a second) battery module 30, where each battery module 28, 30 includes one or more battery cells. In other embodiments, the energy storage component 14 may include any number of battery modules. Additionally, although the first battery module 28 and the second battery module 30 are depicted adjacent to one another, they may be positioned in different areas around the vehicle. For example, the second battery module 30 may be positioned in or about the interior of the vehicle 10 while the first battery module 28 may be positioned under the hood of the vehicle 10.

In some embodiments, the energy storage component 14 may include multiple battery modules to utilize multiple different battery chemistries. For example, the first battery module 28 may utilize a lead-acid battery chemistry and the second battery module 30 may utilize a lithium ion battery chemistry. In such an embodiment, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

Figure 3:
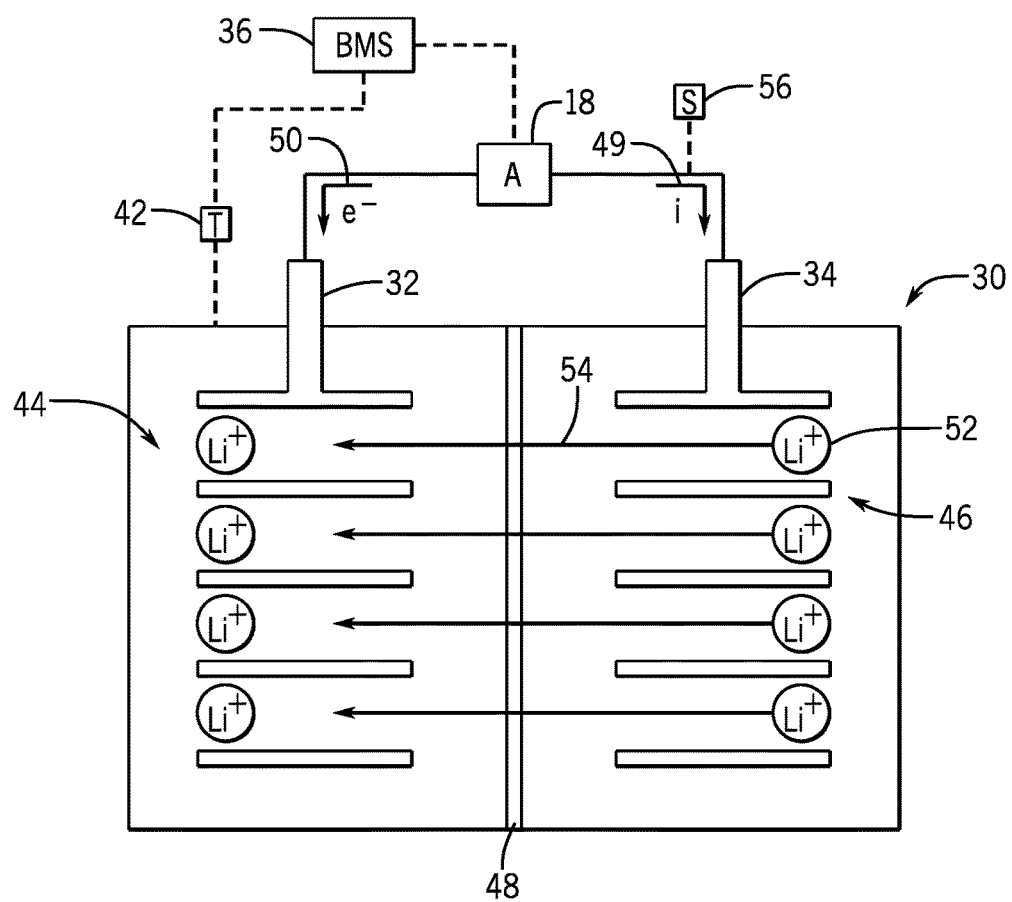
FIG. 3 is a schematic view of a lithium ion battery system, in accordance with an embodiment of the present approach.

To facilitate supply of power from the battery system 12 to the various components in the vehicle's electrical system (e.g., HVAC system and vehicle console 20), the energy storage component 14 (i.e., battery module) includes a first terminal 32 and a second terminal 34. In some embodiments, the second terminal 34 may provide a ground connection and the first terminal 32 may provide a positive voltage ranging between 7-18 volts. A more detailed view of an embodiment of the second battery module 30 of the energy storage component 14 illustrating the above listed components is depicted in FIG. 3.

As previously noted, the energy storage component 14 may have dimensions comparable to those of a typical lead-acid battery to limit modifications to the vehicle 10 design to accommodate the battery system 12. For example, the energy storage component 14 may be of similar dimensions to an H6 battery, which may be approximately 13.9 inches×6.8 inches×7.5 inches. As depicted, the energy storage component 14 may be included within a single continuous housing. In other embodiments, the energy storage component 14 may include multiple housings coupled together (e.g., a first housing including the first battery 28 and a second housing including the second battery 30). In still other embodiments, as mentioned above, the energy storage component 14 may include the first battery module 28 located under the hood of the vehicle 10, and the second battery module 30 may be located within the interior of the vehicle 10.

The energy storage component 14 may include the first terminal 32, the second terminal 34, a first battery (e.g., a lead acid battery) 28, a second battery 30 (e.g., a lithium ion battery), and a battery management system 36. As used herein, the battery management system 36 generally refers to control components that control operation of the battery system 12, such as relays within the battery module or switches in the alternator 18. Additionally, the battery management system 36 may be disposed within the energy storage component 14, or the battery management system 36 may be remote to the energy storage component 14, as depicted in FIG. 2. The operation of the energy storage component 14 may be controlled by the battery management system 36. For example, the battery management system 36 may regulate an amount of electrical energy captured/supplied by each battery module 28 or 30 (e.g., to de-rate and re-rate the battery system 12), perform load balancing between the battery modules 28, 30, control charging and discharging of the battery modules 28, 30 (e.g., via relays or DC/DC converters), determine a state of charge of each battery module 28, 30 and/or the entire energy storage component 14, activate an active cooling mechanism, activate a short circuit protection system, and the like.

Accordingly, the battery management system 36 may include a memory 38 and a processor 40 programmed to execute control algorithms for performing such tasks. More specifically, the processor 40 may include one or more application specific integrated circuits (ASICs), one or more field programmable gate arrays (FPGAs), one or more general purpose processors, or any combination thereof. Additionally, the memory 38 may include volatile memory, such as random access memory (RAM), and/or non-volatile memory, such as read-only memory (ROM), optical drives, hard disc drives, or solid-state drives. In some embodiments, the battery management system 36 may include portions of a vehicle control unit (VCU) and/or a separate battery control module. Additionally, as depicted, the battery management system 36 may be included separate from the energy storage component 14, such as a standalone module. In other embodiments, the battery management system 36 may be included within the energy storage component 14.

Further, the battery management system 36 may interact with sensors coupled to the energy storage component 14. For example, the battery management system 36 may receive a temperature indication from a temperature sensor 42 coupled to the energy storage component 14. The battery management system 36 may also measure current and voltage applied to or withdrawn from the energy storage component 14.

Additionally, as depicted in FIG. 2, the first battery 28 and the second battery 30 are connected in parallel across the first terminal 32 and the second terminal 34 to enable charging and discharging of the batteries. As described above, the battery terminals 32 and 34 may output the power stored in the energy storage component 14 to provide power to the vehicle's electrical system. Further, the battery terminals 32 and 34 may also input power to the energy storage component 14 to enable the first battery 28 and the second battery 30 to charge, for example, when the alternator 18 generates electrical power through regenerative braking.

To provide more detail as to the energy storage component 14, FIG. 3 illustrates a schematic view of components of the second battery 30. As mentioned above in the discussion of FIG. 2, the second battery 30 may utilize a lithium ion chemistry. Accordingly, the second battery 30 is illustrated as a lithium ion battery in FIG. 3. The second battery 30 may include the first terminal 32 coupled at an anode 44 and the second terminal 34 coupled at a cathode 46. Additionally, the anode 44 may be made from carbon (e.g., graphite), silicon, silicon dioxide, or any other suitable material. Further, the cathode 46 may be made from cobalt, manganese, nickel-cobalt manganese, aluminum, or any other suitable material. The anode 44 and the cathode 46 may be separated by a separator 48. The separator 48 may be a polypropylene or polyethylene material that provides electrical separation between the anode 44 and the cathode 46 while allowing charged lithium ions 52 to pass through in an unobstructed manner.

During a charging operation of the second battery 30, an electric current 49 is applied to the second terminal 34 toward the cathode 46. The charging operation may use power generated by the internal combustion engine 24 or power generated by regenerative braking to recharge the second battery 30. Further, as the electric current 49 flows toward the second terminal 34, electrons 50 flow toward the first terminal 32 and the anode 44. In this manner, the electrons 50 entering the anode 44 attract the positively charged lithium ions 52 in such a manner that drives the lithium ions 52 from the cathode 46, through the separator 48, and to the anode 44 along a path 54. As the lithium ions 52 travel to the anode 44 along the path 54, a state of charge of the second battery 30 also increases.

To control charging of the second battery 30, the battery management system 36 may receive inputs from sensors and may control application of power from the alternator 18 to the cathode 46. For example, under certain conditions, lithium plating may occur on the anode 44 at an interface between the anode 44 and the separator 48 as the lithium ions 52 are deposited on the material that makes up the anode 44. For instance, charging the second battery 30 at −40 degrees Celsius may result in a heightened likelihood of lithium plating on the anode 44. Lithium plating may result in battery degradation as the lithium ions 52 deposited on the anode 44 effectively remove active lithium ions 52 from future electrochemical reactions within the second battery 30. Accordingly, a lifespan of the battery 30 may be significantly reduced due to lithium plating on the anode 44 during charging operations. Therefore, it may be desirable to avoid the certain conditions that result in a greater likelihood of lithium plating on the anode 44 by controlling the application of power from the alternator 18 to the cathode 46 during regenerative braking or when the alternator 18 converts mechanical movement of the internal combustion engine 24 into electrical power to charge the energy storage component 14.

To facilitate the aforementioned control, the second battery 30 may include the temperature sensor 42 and/or additional sensors 56. The additional sensors 56 may measure, for example, voltage and/or current 49 applied at the second terminal 34. In general, several factors may influence lithium plating on the anode 44. For example, as a state of charge of the second battery 30 increases, a likelihood of lithium plating also increases. Similarly, as the state of charge of the second battery 30 decreases, the likelihood of lithium plating decreases. Additionally, greater current levels applied to the second battery 30 may increase the likelihood of lithium plating, a decrease in voltage at an interface between the separator 48 and the anode 44 may increase the likelihood of lithium plating, and a decrease in temperature of the second battery 30 may also increase the likelihood of lithium plating. Accordingly, the battery management system 36 may control the application of power by the alternator 18 to the second battery 30 in a number of ways to limit the likelihood of lithium plating on the anode 44 in view of the factors described above.

For example, the current 49 applied during a charging operation may be limited to different levels depending on the state of charge of the second battery 30, the temperature of the second battery 30, a duration and/or frequency of charging pulses applied to the battery 30, or any other factor that may influence the likelihood of lithium plating on the anode 44. Because these conditions may change over time, the battery management system 36 may dynamically control the power output of the alternator 18 into the second battery 30 during the charging operation. Therefore, the likelihood of the anode 44 experiencing lithium plating may not correspond to a specific level of the current 49. Rather, the likelihood of lithium plating at a specific level of the current 49 may vary based on the various factors discussed above.

Figure 4:
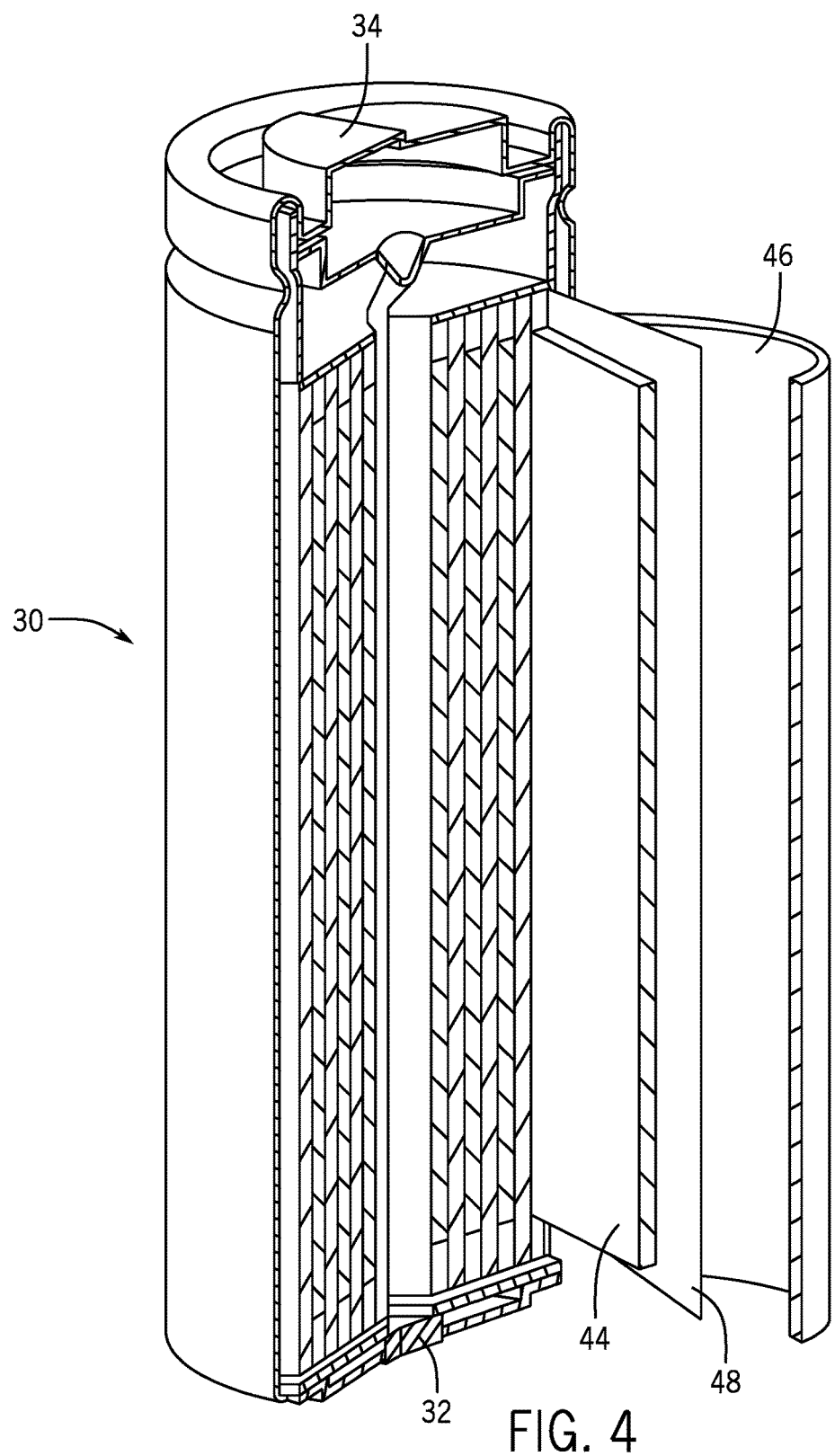
FIG. 4 is a cutaway view of a lithium ion battery with a spiral wound cell structure, in accordance with an embodiment of the present approach.

Turning now to FIG. 4, a cutaway view of the second battery 30 with a spiral wound cell structure is illustrated. The second battery 30 may include the anode 44 and the cathode 46 separated by the separator 48 and wrapped in a spiral wound configuration within the second battery 30. Additionally, the second terminal 34 may electrically couple to the cathode 46 and the first terminal 32 may electrically couple to the anode 44. Accordingly, the spiral wound configuration of the second battery 30 depicted in FIG. 4 may couple to the alternator 18 and the battery management system 36 in a similar manner to the schematic representation of the second battery 30 depicted in FIG. 3. Further, during a recharge operation of the second battery 30, the lithium ions 52 may move from the cathode 46, through the separator 48, and to the anode 44 in a manner similar to the schematic representation of FIG. 3. Furthermore, it may be appreciated that in the spiral wound configuration, the anode 44 and the cathode 46 may generally be disposed within the second battery 30 in a configuration that is parallel to the separator 48.

To illustrate the functionality of the battery management system 36, FIG. 5 is a process flow diagram describing a method 60 for controlling charging operations using an electrochemical model 61 of the second battery 30. Initially, at block 62, an electrochemical model 61 of the second battery 30 may be generated. The electrochemical model 61 of the second battery 30 may estimate a voltage between the separator 48 and the anode 44. As the voltage between the separator 48 and the anode 44 decreases, the likelihood that lithium plating will occur on the anode 44 increases. The estimated voltage value may generally include the negative voltage of the second battery 30 instead of the entire voltage potential of the battery. The electrochemical model 61 of the second battery 30 may determine the negative voltage at which plating is likely to occur on the anode 44 based on factors such as charging current and temperature. By way of example, the electrochemical model 61 may be an extensive mathematical model that solves for dependent variables, such as electrolyte concentration, electrolyte potential, solid concentration, solid potential, reaction rate, local current density, etc., using governing equations based on porous electrode theory and concentrated electrolyte theory. Further, the electrochemical model 61 may generally approximate an energy balance depicted by the following equation:

$$\epsilon \frac{\partial c}{\partial t} = \nabla \epsilon^{1.5} D \left(1 - \frac{d \ln c_0}{d \ln c}\right) \nabla c + \frac{t^0 \nabla i_2 + i_2 \nabla t^0}{z_+ v_+ F} - \nabla c v_0 + a j_- \quad (1)$$

where $\epsilon$ is a volume fraction of electrolyte within the second battery 30, c is salt concentration in the electrolyte, t is time, D is a salt diffusion coefficient, $t^0$ is a transference number of species with respect to solvent velocity, $i_2$ is a transfer current density normal to the surface of an active material, z is an ion change, v is a differential volume element, F is Faraday's constant, and j is a flux of species normal to the electrode interface due to the electrochemical reaction. However, approximating equation 1 with the electrochemical model 61 may have a high computation cost.

Accordingly, at block 64, a reduced order model 63 of the electrochemical model for the second battery 30 may be generated to reduce the computation cost. For example, the electrochemical model 61 may be generated but only used to obtain the reduced order model 63, which may be employed for determining conditions that may increase the likelihood of lithium plating to avoid such conditions at the second battery 30. The reduced order model 63 may decrease computational complexity of the electrochemical model 61 for the second battery 30. For example, the reduced order model 63 may reduce state space dimensions or degrees of freedom of the electrochemical model 61 to provide a computationally efficient alternative to the electrochemical model 61. Additionally, or alternatively, a look-up table 65 or an equivalent circuit model 67 (e.g., a circuit model that substitutes electrical characteristics of a circuit of the second battery 30) relating to the electrochemical model 61 for the second battery 30 may also be generated and stored in the memory 38 of the battery management system 36. The reduced order model 63, the look-up table 65, and the equivalent circuit model 67 may decrease computation cost by reducing the complexity of the electrochemical model 61. Accordingly, a time cost for dynamically changing charging parameters may also be reduced. The reduced order model 63 of the electrochemical model 61 for the second battery 30 may be in the form:

$$\bar{J}_s(t) = \begin{cases} a_n i_{0,s} \left[ \exp\left(\frac{\alpha_{a,s} F}{R_g T} \bar{\eta}_{s,oc}(t)\right) - \exp\left(-\frac{\alpha_{c,s} F}{R_g T} \bar{\eta}_{s,oc}(t)\right) \right], & x_0 < L_n \\ 0, & x_0 = L_n \end{cases} \quad (2)$$

where $\bar{J}_s(t)$ is a measure of a rate of irreversible lithium loss due to lithium plating, $a_n$ is a surface area of a porous electrode, $i_{0,s}$ is an exchange current density for an intercalation reaction, $\alpha_{a,s}$ is an anodic coefficient of the electrochemical reaction, F is Faraday's constant, $R_g$ is a particle radius, T is temperature, $\overline{\eta}_{s,oc}(t)$ is a local overpotential that drives the electrochemical reaction, $\alpha_{c,s}$ is a cathodic coefficient of the electrochemical reaction, $x_0$ is a length dimension, and $L_n$ is the length of a cell or electrode. The reduced order model 63 provided by equation 2 yields an algebraic solution rather than a differential solution of the lithium plating likelihood. Accordingly, implementing the reduced order model 63 over the electrochemical model 61 may result in increased processing efficiency when determining a likelihood of lithium plating.

Further, the look-up table 65 may relate various measurable factors of the second battery 30 to determine the likelihood of lithium plating at the anode 44 based on the electrochemical model 61 of the second battery 30. For example, the look-up table 65 may provide a mechanism for relating the temperature of the second battery 30 and the current 49 of the charging operation to the likelihood of lithium plating. Accordingly, the look-up table 65 may enable the battery management system 36 to estimate a likelihood of lithium plating on the anode 44 based on the electrochemical model 61.

Furthermore, the equivalent circuit model 67 may provide a simplified representation of the second battery 30. For example, the equivalent circuit model 67 may be represented in the form:

$$V_k = K_0 - \frac{K_1}{z_k} + K_3\ln(z_k) + K_4\ln(1-z_k) - R_0 I_k \qquad (3)$$

where $V_k$ is a terminal voltage of the second battery 30, $z_k$ is a state of charge of the second battery 30, $I_k$ is a charge current of the second battery 30, $K_{1...4}$ are parameters for a dependence between an open circuit voltage of the second battery 30 and the state of charge, and $R_0$ is an internal ohmic resistance that depends on a direction of current flow. Similar to the reduced order model 63, the equivalent circuit model 67 yields an algebraic solution, which may increase processing efficiency when determining the likelihood of lithium plating.

For example, at block 66, measurable factors of the second battery 30 may be applied to the reduced order model 63, the look-up table 65, and/or the equivalent circuit model 67. In this manner, the simplified models may provide an indication to the battery management system 36 of the likelihood of lithium plating on the anode 44. For example, the reduced order model 63, the look-up table 65, and the equivalent circuit model 67 may each provide an indication, based on an estimated voltage at the interface between the separator 48 and the anode 44, of whether the lithium plating is likely to occur.

Subsequently, at block 68, charging operations may be controlled by the battery management system 36 based on the determined lithium plating likelihood. For example, the battery management system 36 may control the alternator 18 to reduce the current 49 entering the cathode 46 of the second battery 30 to reduce the likelihood of lithium plating when the measurable factors of the second battery 30 indicate that the likelihood of lithium plating is above a threshold. Additionally, the battery management system 36 may limit the pulse duration of the charging operation to reduce the likelihood of lithium plating when the measurable factors of the second battery 30 indicate that the likelihood of lithium plating is above a threshold. The threshold for the likelihood of lithium plating may, for example, be when the likelihood of lithium plating is greater than 50 percent.

In another embodiment, FIG. 6 is a process flow diagram describing a method 80 for controlling charging operations of a battery to reduce lithium plating on an anode of the battery based on a predictive model including a physical model 83 and/or an empirical model 85 of lithium plating on the anode 44 of the second battery 30. Initially, at block 82, cell voltage, current, and temperature of the second battery 30 may be observed over time during a charging operation. Additionally, in some embodiments, other additional parameters related to the second battery 30 and the charging operation, such as cell state of charge, cell age, charge pulse duration, etc., may also be observed.

After observing effects of the above referenced parameters on the second battery 30 over a period of time, at block 84, a lithium plating physical model 83 and/or a lithium plating empirical model 85 may be generated based on the observations. The lithium plating physical model 83 may, for example, be a physical model 83 of lithium precipitation and growth that predicts lithium plating as a function of potential on the anode 44. Accordingly, the physical model 83 may relate the cell voltage measurements, current measurements, and temperature measurements of the second battery 30 at a specific time to determine a likelihood of lithium plating on the anode 44 at the specific time. For example, the physical model 83 may be represented by the following general equation:

Probability of Lithium Plating=$f$[Rate of lithium precipitation(Anode($I(t)$&$V(t)$)),lithium diffusion rate(SOC),Rest($t$),temperature ($t$),aging($t$)],$t$:time (4)

The likelihood of lithium plating may be calculated through establishing the physical model 83 as a function of: a rate of lithium precipitation, which is a function of anode voltage, current, and time; a lithium diffusion rate in the anode 44, which is a function of the state of charge (SOC) of the second battery 30; a resting time; a temperature of the second battery 30; and battery aging conditions. Parameters and functions of the physical model 83 may be developed from full cell, half cell, and various electrochemical (e.g., AC impedance and/or Galvanostatic Intermittent Titration Technique (GITT)) testing data of the second battery 30.

Additionally, the empirical model 85 may, for example, track ampere-seconds (A-s) of the current 49 applied during a charging operation when the potential at the anode 44 indicates an increased likelihood of lithium plating on the anode 44. For example, the empirical model 85 may indicate that a certain amount of ampere-seconds applied to the second battery 30 within a certain time period may result in an increased likelihood of lithium plating on the anode 44. Additionally, the temperature of the second battery 30 and the voltage applied to the second battery 30 may also influence the certain amount of ampere-seconds that may increase the likelihood of lithium plating. By tracking the ampere-seconds of the current 49, along with the temperature and voltage, the empirical model 85 may enable the battery management system 36 to track when the likelihood of lithium plating increases.

Similarly, another empirical model 85 may classify the likelihood of lithium plating as a function of a magnitude of the current 49 applied during a charging operation, the potential at the anode 44, and time. Accordingly, the empirical model 85 may be generated by observing lithium plating over time based on various battery conditions during a charging operation to provide a model for the likelihood of lithium plating at the anode 44. In this empirical model 85, the battery management system 36 may track the magnitude of the current 49 to make a determination as to the likelihood of lithium plating at the anode 44 based on the magnitude of the current 49.

By way of example, the empirical model 85 may be represented by the following general equation:

$$\text{Probability of Lithium Plating} = f[\text{Cell}I(t), \text{Cell}V(t), \text{Cell Temperature}(t), \text{Cell SOC}(t), \text{aging}(t)], t:\text{time} \quad (5)$$

The likelihood of lithium plating may be calculated from an empirically developed function which applies a cell current profile, cell voltage, cell temperature, cell SOC, and battery aging conditions to the likelihood of lithium plating at the anode 44. The empirically developed function may include polynomial functions or the empirically developed function may be generated from look-up data, which is developed or derived from the physical model 83 or design of experiments (DOE) experimental data.

After generating a physical model 83 and/or an empirical model 85, at block 86 present conditions of the second battery 30 may be measured. By measuring the present conditions of the second battery 30, at block 88, the battery management system 36 may determine present lithium plating probabilities based on the present conditions of the second battery 30 using the physical model 83 and/or the empirical model 85. Additionally, in some instances both a physical model 83 and an empirical model 85 may be used in determining the lithium plating probabilities on the anode 44. For example, the physical model 83 and the empirical model 85 may generally be less accurate than the electrochemical model 61 described in relation to the method 60 of FIG. 5. However, the physical model 83 and the empirical model 85 may each use significantly less computational power than the electrochemical model 61. Accordingly, in some situations, the battery management system 36 may assign an accuracy factor to each of the physical model 83 and the empirical model 85 to determine which model to use for a specific situation. For example, the physical model 83 may be more accurate at low temperatures (e.g., during winter months), while the empirical model 85 may be more accurate while the second battery 30 experiences warmer temperatures. Accordingly, the battery management system 36 may select between the two models based on measured conditions and known strengths of the physical and empirical models 83 and 85 (e.g., based on accuracy factors of the models under specific conditions).

Subsequently, at block 90, the battery management system 36 may control charging operations based on the lithium plating likelihood determined from either or both of the empirical model 85 and the physical model 83. For example, if the models indicate that there is a high likelihood of lithium plating under present charging conditions of the second battery 30, the battery management system 36 may, for example, control the alternator 18 to output the current 49 at a lower level. Likewise, in some situations, the battery management system 36 may control the alternator 18 to decrease charge pulse durations that are applied to the second battery 30 when the battery management system 36 detects an increased likelihood of lithium plating on the anode 44. It may be appreciated that the electrochemical model 61, the reduced order model 63, the look-up table 65, the equivalent circuit model 67, the physical model 83, the empirical model 85, and any other model related to lithium plating may all generally be defined as lithium plaiting models in the context of this disclosure.

In some instances, the likelihood of lithium plating may be determined to be greater than a threshold value when the likelihood of lithium plating is greater than 50 percent. Additionally, in other instances, the likelihood of lithium plating may be determined to be greater than the threshold value when the likelihood is greater than approximately 70 percent, 75 percent, or 80 percent under the present charging operation conditions. Further, any other method of altering the charging operations that results in a reduction in the likelihood of lithium plating may also be employed by the battery management system 36 upon determining that the likelihood of lithium plating is above the threshold value.

One or more of the disclosed embodiments, alone or on combination, may provide one or more technical effects including decreasing the likelihood of lithium plating on the anode 44 of the second battery 30. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system, comprising:
   a lithium ion battery configured to couple to an electrical system; and
   a battery management system configured to electrically couple to the lithium ion battery and configured to control one or more recharge operations of the lithium ion battery based on a plurality of lithium plating models and one or more monitored parameters, wherein the plurality of lithium plating models is indicative of a relationship between the one or more monitored parameters and a likelihood of lithium plating occurring in the lithium ion battery, and wherein the plurality of lithium plating models comprises a physical model and an empirical model related to lithium plating at an anode of the lithium ion battery;
   wherein the battery management system is configured to:
   monitor the one or more monitored parameters of the lithium ion battery;
   assign one or more accuracy factors to the physical model and the empirical model based on a temperature associated with the lithium ion battery;

determine which of the physical model, the empirical model, or both to use as a trigger to control the one or more recharge operations of the lithium ion battery based on the one or more accuracy factors in view of the one or more monitored parameters; and control the one or more recharge operations of the lithium ion battery based on the trigger, the plurality of lithium plating models, and the one or more monitored parameters.

2. The battery system of claim 1, wherein the battery management system is configured to control an alternator to control the one or more recharge operations of the lithium ion battery.

3. The battery system of claim 1, wherein the one or more monitored parameters of the lithium ion battery comprise charge current, the temperature, state of charge, charging pulse duration, cell age, resting time, or any combination thereof.

4. The battery system of claim 1, wherein the plurality of lithium plating models comprises a reduced order electrochemical model of the lithium ion battery.

5. The battery system of claim 1, wherein the physical model or the empirical model is configured to provide an indication of the likelihood of the lithium plating occurring at the anode.

6. The battery system of claim 5, wherein the physical model or the empirical model is generated based on one or more effects of the one or more recharge operations on the lithium ion battery over time.

7. The battery system of claim 1, wherein at least one lithium plating model of the plurality of lithium plating models is influenced by a battery temperature of the lithium ion battery.

8. The battery system of claim 1, wherein the lithium ion battery is configured to electrically couple in parallel to a lead-acid battery within a single housing.

9. A method to control a charging operation of a lithium ion battery, comprising:

measuring, via a processor, one or more parameters of the lithium ion battery during the charging operation;

determining, via the processor, a likelihood of lithium plating at an anode based on a plurality of models relating to the likelihood of lithium plating at the anode of the lithium ion battery, wherein the plurality of models indicates a relationship between the one or more parameters of the lithium ion battery and the likelihood of lithium plating, wherein the plurality of lithium plating models is indicative of a relationship between the one or more parameters and the likelihood of lithium plating occurring in the lithium ion battery, and wherein the plurality of lithium plating models comprises a physical model and an empirical model related to lithium plating at the anode of the lithium ion battery; and controlling, via the processor, the charging operation of the lithium ion battery based on the likelihood of lithium plating at the anode, wherein controlling the charging operation of the lithium battery comprises:

assigning, via the processor, one or more accuracy factors to the physical model and the empirical model based on a temperature associated with the lithium ion battery;

determining, via the processor, which of the physical model, the empirical model, or both to use as a trigger to control the charging operation of the lithium ion battery based on the one or more accuracy factors in view of the one or more parameters; and controlling, via the processor, the charging operation of the lithium ion battery based on the trigger, the plurality of lithium plating models, and the one or more parameters.

10. The method of claim 9, comprising:

observing cell voltage, current, and the temperature of the lithium ion battery during the charging operation; and generating at least one model of the plurality of models based on one or more effects of the cell voltage, the current, and the temperature during the charging operation on the lithium plating at the anode.

11. The method of claim 10, wherein the physical model relates observed physical characteristics of the lithium ion battery to the likelihood of lithium plating, and wherein the empirical model relates the cell voltage, the current, and the temperature observed over time to the likelihood of lithium plating.

12. The method of claim 9, wherein at least one model of the plurality of models comprises a reduced order electrochemical model of the lithium ion battery configured to reduce computational complexity of an electrochemical model of the lithium ion battery.

13. The method of claim 9, wherein at least one model of the plurality of models is represented as a look-up table.

14. A battery module for use in a vehicle, comprising:

a housing;

a first terminal and a second terminal;

a first battery disposed in the housing and configured to couple to the first terminal and the second terminal;

a second battery disposed in the housing, electrically coupled in parallel with the first battery, and configured to electrically couple to the first terminal and the second terminal;

a battery management system configured to monitor one or more parameters of a charging operation of the battery module, and to control the charging operation of the second battery based on based on a plurality of lithium plating models and one or more monitored parameters, wherein the plurality of lithium plating models is indicative of a relationship between the one or more parameters and a likelihood of lithium plating occurring in the second battery, and wherein the plurality of lithium plating models comprises a physical model and an empirical model related to lithium plating at an anode of the second battery, and wherein the battery management system is configured to:

monitor the one or more parameters of the lithium ion battery;

assign one or more accuracy factors to the physical model and the empirical model based on a temperature associated with the second battery;

determine which of the physical model, the empirical model, or both to use as a trigger to control the charging operation of the second battery based on the one or more accuracy factors in view of the one or more parameters; and control the charging operation of the second battery based on the trigger, the plurality of lithium plating models, and the one or more monitored parameters.

15. The battery module of claim 14, wherein the plurality of lithium plating models comprises an electrochemical model of the second battery, wherein the electrochemical model estimates a voltage between a separator and an anode of the second battery.

16. The battery module of claim 14, wherein the plurality of lithium plating models comprises a predictive model of the second battery, and wherein the predictive model of the second battery comprises the physical model that relates observed physical characteristics of the second battery to the likelihood of lithium plating in the second battery and the empirical model of the second battery that relates measured parameters of the second battery over time to the likelihood of lithium plating in the second battery.

17. The battery module of claim 14, wherein the battery management system is configured to control the charging operation by reducing a charge current applied to the second battery by an alternator.

18. The battery module of claim 14, wherein the charging operation is configured to use power generated through regenerative breaking to charge the first battery and the second battery.

* * * * *

UNITED STATES PATENT AND TRADEMARK OFFICE
CERTIFICATE OF CORRECTION

PATENT NO. : 10,183,588 B2
APPLICATION NO. : 14/989578
DATED : January 22, 2019
INVENTOR(S) : Jin et al.

It is certified that error appears in the above-identified patent and that said Letters Patent is hereby corrected as shown below:

On the Title Page

1. In Item (72), under "Inventors", in Column 1, Line 1, delete "Zhihong Jin," and insert --Zhihong H. Jin,--, therefor.

In the Specification

2. In Column 1, Line 32, delete "full hybrid systems" and insert --full hybrid electric vehicles--, therefor.

3. In Column 1, Line 35, delete "mild hybrid systems" and insert --mild hybrid electric vehicles--, therefor.

4. In Column 3, Line 9, delete "DRAWINGS" and insert --BRIEF DESCRIPTION OF DRAWINGS--, therefor.

5. In Column 3, Line 14, delete "is perspective view" and insert --is a perspective view--, therefor.

6. In Column 10, Line 24, delete "$t^0$" and insert --$t^0$--, therefor.

7. In Column 12, Lines 31-32, delete "precipitation(Anode" and insert --precipitationAnode--, therefor.

In the Claims

8. In Column 15, Line 28, in Claim 6, delete "claim 5," and insert --claim 1,--, therefor.

9. In Column 16, Line 40, in Claim 17, delete "based on based on" and insert --based on--, therefor.

Signed and Sealed this
Sixteenth Day of April, 2019

Andrei Iancu
*Director of the United States Patent and Trademark Office*